Patented Oct. 30, 1951

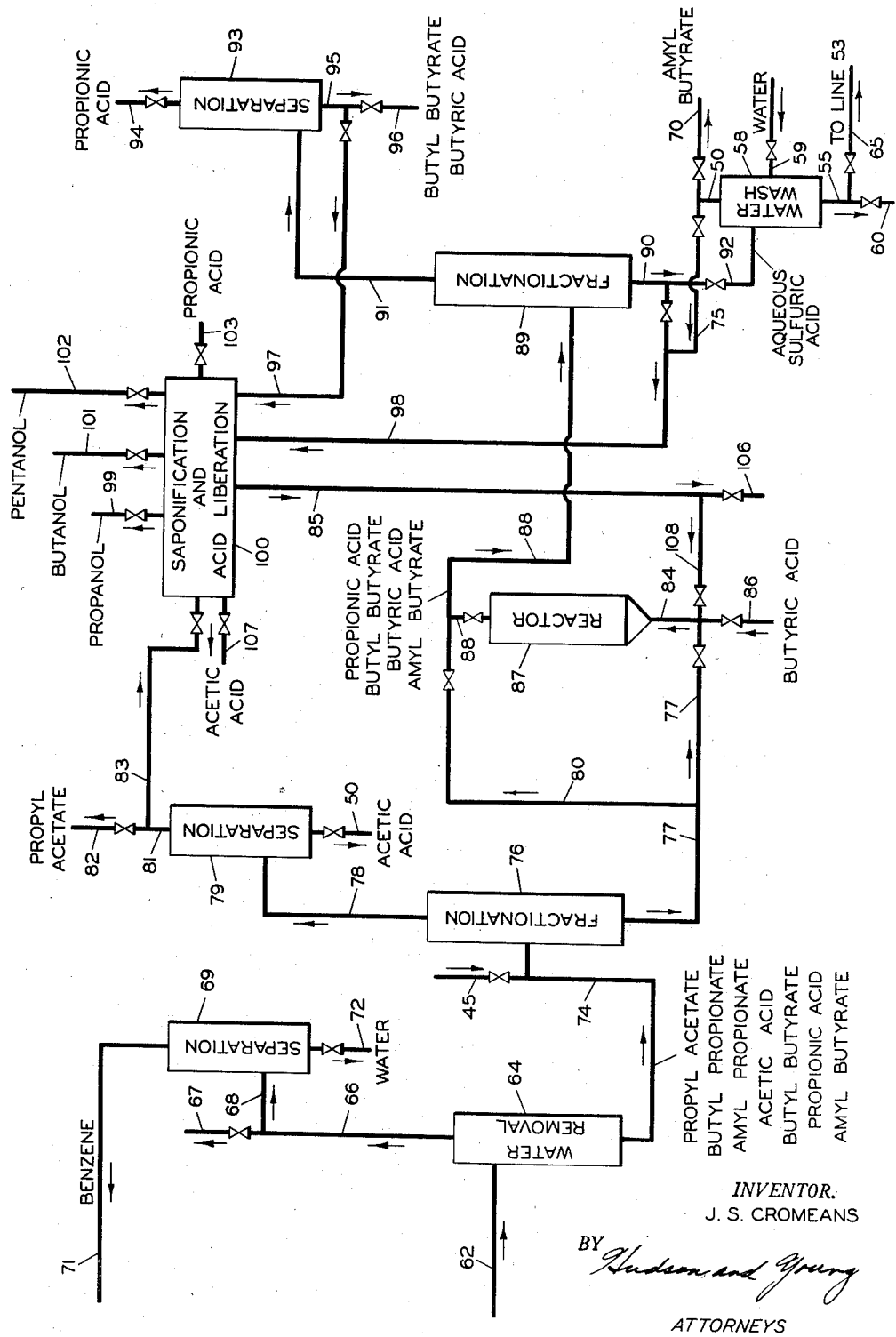

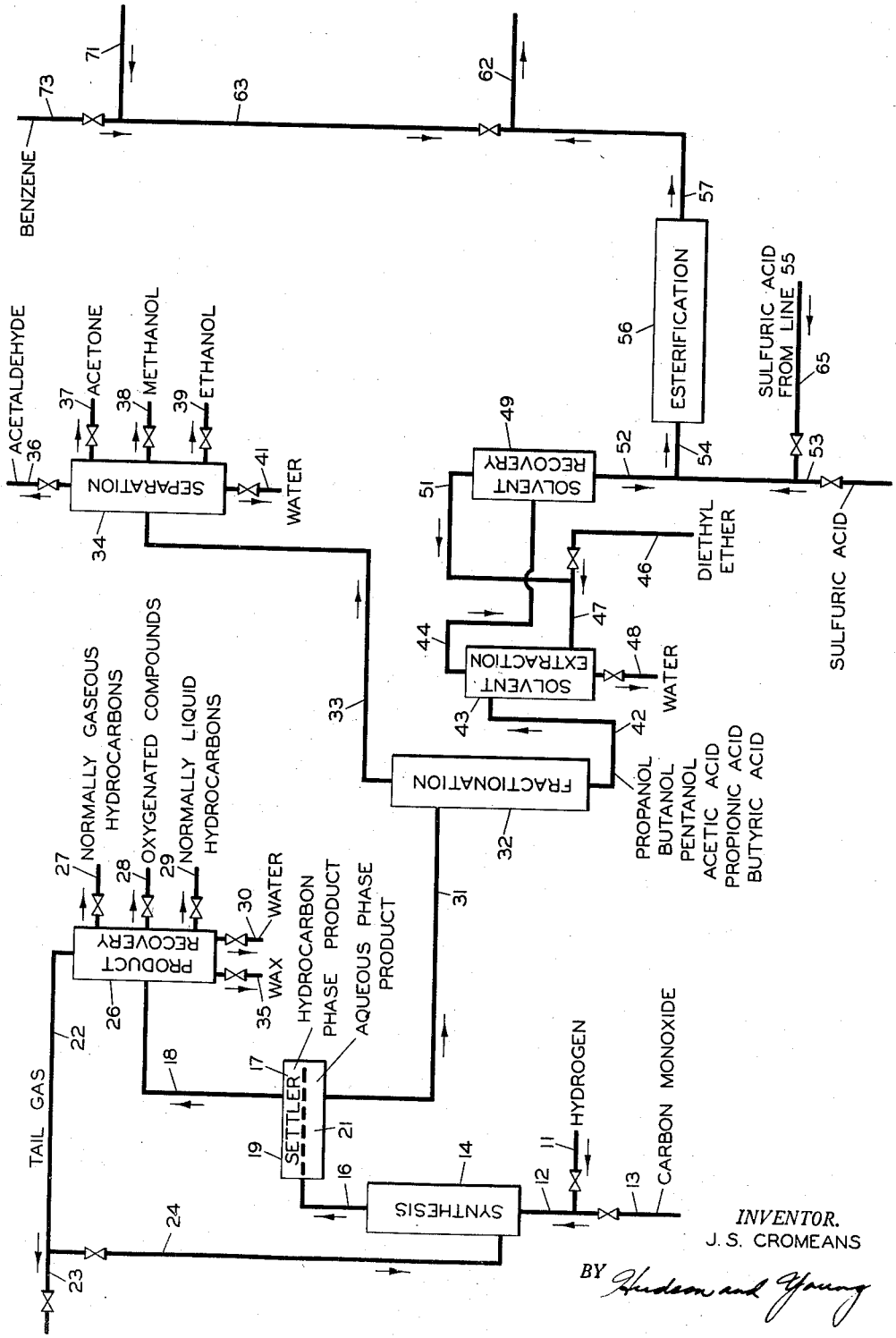

2,573,185

UNITED STATES PATENT OFFICE 2,573,185

SEPARATION OF OXYGEN-CONTAINING COMPOUNDS

John S. Cromeans, Dewey, Okla., assignor to Phillips Petroleum Company, a corporation of Delaware Application December 20, 1948, Serial No. 66,353

11 Claims. (Cl. 260—488)

This invention relates to the hydrogenation of carbon monoxide to produce hydrocarbons and oxygen-derivatives of hydrocarbons. In one aspect this invention relates to a process for resolving a mixture of chemical compounds not readily resolved by fractionation alone. In another aspect this invention relates to a process for resolving aqueous phase product obtained from the catalytic hydrogenation of carbon monoxide.

Certain solutions of organic compounds are often difficult to resolve by fractionation alone due to the close proximity of the boiling points of certain of the components and/or to the formation of azeotropes. Such a solution presenting various difficulties in its complete resolution by fractionation alone is an alcohol-organic acid solution of which alcohols and acids, containing from 2 to 5 carbon atoms per molecule, are the chief components. An example of such a mixture of organic compounds is one obtained from the catalytic hydrogenation of carbon monoxide.

In the catalytic hydrogenation of carbon monoxide, a product comprising various hydrocarbons and oxygen-containing derivatives of hydrocarbons is obtained, in relative yields specifically dependent upon the choice of hydrogenation conditions. For example, hydrogen and carbon monoxide may be passed to a catalytic zone containing an iron catalyst under reaction conditions suitable for the production of hydrocarbons predominantly, together with by-product water and minor amounts of oxygen-containing derivatives of hydrocarbons. A water-rich product phase, referred to herein as aqueous phase product, and a hydrocarbon-rich phase are formed when the effluents are cooled and condensed, throughout each of which oxygen-containing compounds are distributed. Oxygen-containing product obtained from the catalytic hydrogenation of carbon monoxide comprises chiefly alcohols, aldehydes, organic acids and ketones containing from 2 to 5 carbon atoms per molecule together with relatively small amounts of esters and higher molecular weight compounds. Typical of the chief organic components in the aqueous phase product are acetaldehyde, acetone, methanol, ethanol, propanol, butanols, pentanols, acetic acid, propionic acid and butyric acid. This product is difficult to resolve by fractionation alone in view of the close proximity of the boiling points of certain of the compounds, and the formation of certain azeotropes. Further, when fractionating the total aqueous product in the recovery of the individual components, ester impurities are formed, reducing the ultimate yield of desired product and further complicating the fractionation process by virtue of adding to the number of components already present.

In resolving an aqueous solution of organic compounds, of the type above described, by fractionation alone, precise and expensive equipment is required. Such processes are slow and laborious and are not economically feasible.

My invention is concerned with the resolution of a solution of alcohols and organic acids, containing usually from 2 to 5 carbon atoms per molecule, and particularly with the resolution of an aqueous solution of such compounds obtained as aqueous phase product from the catalytic hydrogenation of carbon monoxide.

An object of this invention is to provide a process for the hydrogenation of carbon monoxide to produce hydrocarbons and oxygen-containing derivatives of hydrocarbons and for the recovery of the product formed.

Another object is to provide a process for the resolution of a fraction of organic oxygen-containing compounds.

Another object is to provide a process for the resolution of aqueous phase products obtained from the catalytic hydrogenation of carbon monoxide.

Still another object is to provide a process for the resolution of an aqueous solution containing as the chief organic components, acetaldehyde, acetone, methanol, ethanol, propanol, butanol, pentanol, acetic acid, propionic acid and butyric acid.

Other objects will be apparent, to one skilled in the art, from the accompanying discussion and disclosure.

In accordance with my invention such an alcohol-organic acid solution from a process for reacting carbon monoxide and hydrogen, containing alcohols and acids usually having from 2 to 5 carbon atoms per molecule, as chief components, and not readily resolved by fractionation alone, is resolved by first esterifying the alcohols with the acids in solution therewith, and then introducing butyric or valeric acid to the ester-containing product and reacting the acid thus added in a displacement type reaction with esters containing a lower molecular weight acid radical, to displace the lower molecular weight acid and to form the corresponding ester, whereby an adequate boiling point difference between succeeding compounds to be separated, including the displaced acids and the newly formed esters, is provided so that the resulting reaction mixture may be resolved by fractionation.

My invention, in a preferred embodiment, is particularly well applied to the resolution of aqueous phase product from the catalytic hydrogenation of carbon monoxide, the aqueous product already having been described. In such practice of my invention I top the total aqueous product to produce acetaldehyde, acetone, methanol and ethanol as the chief components of the overhead product, together with some water removed as azeotropes. I find usually that by maintaining a temperature of about 85° C. in the top of a fractional distillation column, as measured at atmospheric pressure, the topping operation is most conveniently and efficiently conducted. The overhead products thus obtained are resolvable by conventional means. Residual aqueous product from the topping operation is then extracted with a suitable solvent such as benzene, diethyl ether, or the like, to separate remaining organic components from the water. The resulting extract is then stripped of solvent and the solvent-free extract is subjected to esterification conditions to form esters from the acids and the alcohols present. Water of esterification may be removed by azeotropic distillation with a suitable water-azeotrope-forming material such as benzene, n-heptane, cyclohexane, or the like. The resulting ester-containing mixture, free of water, and containing some excess acids is fractionated to remove propyl acetate and acetic acid as overhead product, which is resolvable by fractionation. The residual product of fractionation of the ester-containing mixture contains propionic acid, butyl propionate, butyl butyrate, amyl propionate, and amyl butyrate, as chief components. Butyric acid and/or valeric acid, preferably the former, is added to the residual product of fractionation of the ester-containing mixture, and reacted with the propionates to displace propionic acid and to form the corresponding esters. When butyric acid is added, propionic acid is displaced from the propionates and the corresponding esters, butyl butyrate and amyl butyrate are formed. The displacement reaction mixture resulting from the reaction of the propionates with either butyric or valeric acid may be resolved by fractionation. The reaction with butyric acid or valeric acid decreases the number of components in the ester-containing mixture and produces a mixture that is readily resolvable by fractionation.

The butyl butyrate and amyl butyrate and propyl acetate products may be conveniently utilized, although, if desired, they may be reconverted to propanol, butanol, pentanol, acetic acid and butyric acid by saponification and hydrolysis methods, well known to those skilled in the art.

In order to present my invention more clearly, reference is made to the attached drawing which is a flow diagram illustrating the practice of a preferred embodiment of my invention. The drawing is on two sheets which may be placed together and read as one figure. It is to be understood that the flow diagram is diagrammatic only and may be altered in many respects by those skilled in the art and yet remain within the intended scope of my invention.

Referring to the figure, hydrogen from line 11 is admixed with carbon monoxide from line 13 to form an admixture in line 12 containing hydrogen in a mole ratio to carbon monoxide within the limits of 0.5:1 to 2.5:1, preferably about 2:1. The carbon monoxide-hydrogen feed in line 12 is passed to catalytic synthesis zone 14 and contacted therein with a fluidized iron catalyst at a space velocity within the range of 1500 to 3500 standard gas volumes per catalyst volume per hour, at a temperature within the limits of 295 to 325° C., and at a pressure within the limits of from 5 to 30 atmospheres. Catalyst may be recycled between zone 14 and a catalyst regeneration zone, not shown. An iron catalyst is most generally employed, and can be prepared by fusing iron or iron oxide in an oxygen flame, adding a desired promoter, such as for example potassium oxide, alumina, or lime, to the molten mass, cooling the molten mixture to form a solid catalyst mass, grinding the cooled solid catalyst, preferably to a mesh size within the range of about 80 to 200 mesh, and reducing the ground catalyst with hydrogen. Total effluent from zone 14 is passed through line 16 to cooling, condensing and settling zone 19 wherein a hydrocarbon-rich and a water-rich phase separate into two layers, 17 and 21 respectively.

Product gases from zone 14, present in settling zone 19, are discharged from zone 19 together with phase 17 through line 18 to hydrocarbon separation and recovery means 26, comprising fractionation equipment, solvent extraction facilities, separators, storage tanks and the like, not individually illustrated, wherein synthesis product from line 18 is separated into the desired fractions or components, for ultimate recovery. Tail gas, predominantly hydrogen, carbon monoxide and carbon dioxide may be recycled from zone 26 to zone 14 through lines 22 and 24 in a preferred mole ratio to fresh gas feed within the limits of 2:1 to 5:1. However, tail gas may be withdrawn from line 22 through line 23, in any desired amount. From zone 26 normally gaseous hydrocarbons are withdrawn through line 27, oxygenated compounds are withdrawn through line 28, normally liquid hydrocarbons are withdrawn through line 29, water is withdrawn through line 30 and wax and other normally solid products are withdrawn through line 35. The volumes of aqueous phase product 21 and hydrocarbon phase 17 are usually about equal. Aqueous phase 21 usually contains from about 5 to about 15 per cent of oxygen-containing materials, comprising such compounds as aldehydes, alcohols, organic acids and ketones, and contains acetaldehyde, acetone, acetic acid, methanol, ethanol, propanol, butanol, pentanol, propionic acid and butyric acid, as the chief components. The total yields of oxygen-containing compounds obtained in the aqueous phase product are usually within the limits of 0.1 to 0.5 gallons per thousand standard cubic feet of fresh synthesis gas feed, i. e., the total carbon monoxide plus hydrogen introduced through lines 11 and 13. Aqueous phase 21 is passed through line 31 and topped in fractionation zone 32 to separate acetaldehyde, acetone, methanol and ethanol together with some water, as on overhead product. When operating at atmospheric pressure, an overhead temperature of about 85° C. is generally employed. Overhead product from fractionation zone 32 is passed through line 33 to separation means 34, comprising various types of fractionation equipment, solvent extraction facilities, coolers, separators and the like, not individually illustrated, wherein the overhead product from line 33 is separated into the desired fractions or components for ultimate recovery. Frome zone 34 is withdrawn acetaldehyde from line 36, acetone from line 37, methanol from line 38, ethanol from line 39 and water from line 41. Residual product of fractionation in zone 32 contains the remaining chief components, propanol, butanol, pentanol, acetic acid, propionic acid, and butyric acid and is passed from zone 32 through line 42 to solvent extraction zone 43 wherein the remaining organic components are extracted from the aqueous material entering through line 42, upon being contacted in downward countercurrent flow with diethyl ether introduced through lines 46 and 47. Extract phase, comprising the organic components introduced through line 42 to zone 43 plus the ether solvent, is passed overhead through line 44 to solvent recovery or stripper zone 49, usually a flash chamber. Water, free of organic components, is withdrawn from zone 43 through line 48. Solvent, separated in zone 49, is recycled therefrom through lines 51 and 47 to zone 43. Solvent-free extract is passed from solvent recovery zone 49 through line 52 and admixed in line 54 with from 0.01 to 0.5 per cent by weight of sulfuric acid in aqueous solution introduced from line 53 and/or recycled from zone 58, described hereafter, and the resulting admixture is passed to esterification zone 56, maintained usually at a temperature within the range of from 20 to 50° C., although higher or lower temperatures may be utilized. Although I prefer usually to employ sulfuric acid, any mineral acid may be used in the esterification step herein, and retained in the system for utilization in subsequent steps discussed hereafter. In zone 56 esters are formed in the admixture introduced from line 54, by the interaction of alcohols and organic acids present therein. Zone 56 contains in addition to esterification reaction equipment, facilities for recovering any unreacted alcohols and acids if desired, each in any desired proportion, and recycling same to the esterification reaction. Ester-containing product, substantially free of any unreacted alcohols and containing some unreacted acid, is passed from zone 56 through line 57 and admixed in line 62 with benzene from line 63, and the resulting admixture introduced to zone 64, wherein water of esterification is removed azeotropically with the benzene thus added, as overhead product through line 66. Benzene-water azeotrope from line 66 may be passed through line 67 to a utilization, not shown, although it is more preferably passed through line 68 to separation zone 69 wherein a benzene and a water layer are formed, and from which benzene may be recycled through lines 71, 63 and 62 to zone 64. Fresh benzene may be introduced to line 63 through line 73. Water is withdrawn from zone 69 through line 72. Ester-containing product, free of water of esterification, contains as the chief components, propyl acetate, butyl propionate, amyl propionate, butyl butyrate, amyl butyrate, acetic acid and propionic acid, together with sulfuric acid introduced through line 53, and is passed from zone 64 through line 74 to fractionation zone 76 wherein it is fractionated to produce an overhead product comprising acetic acid and propyl acetate. Overhead product in line 78 may include, in addition to propyl acetate and excess acetic acid, unreacted in zone 56, acetic acid displaced from any other acetates present, which would be, primarily, butyl acetate and/or amyl acetate. Such a displacement results from the reaction of propionic acid and/or butyric acid with butyl acetate and/or amyl acetate, catalyzed by the sulfuric acid present. This type reaction is further discussed hereafter. Overhead product from zone 76 is passed through line 78 to separation zone 79 usually a fractionation system wherein it is separated into propyl acetate as an overhead product withdrawn through lines 81 and 82, and acetic acid as a residual product, withdrawn through line 50. Propyl acetate in line 81 may be converted to propanol and acetic acid, as will be discussed hereafter. Residual product from zone 76 contains butyl butyrate, amyl butyrate, butyl propionate, amyl propionate, and propionic acid as chief components, together with sulfuric acid introduced through line 53, and is passed from zone 76 through line 77, admixed in line 84 with butyric acid introduced through line 86 in a mole ratio of butyric acid to the total propionates, within the limits of 1:1 to 5:1, and the resulting admixture is passed to reaction zone 87 maintained at a temperature within the limits of 120 to 200° C., at about atmospheric pressure. In zone 87, butyric acid introduced from line 84 reacts catalytically with propionates to displace propionic acid and to form the corresponding butyl ester, with sulfuric acid as a catalyst, introduced through line 53. This reaction may be described in general as a displacement type reaction, more particularly, a replacement of a lower molecular weight acid radical of an ester, by the acid radical of the selected organic acid to form the corresponding acid and ester. Herein the chief displacement reactions are those already discussed as regards acetic acid in line 78, and those taking place in zone 87 wherein butyric acid is reacted with butyl propionate and with amyl propionate, the corresponding acid formed in each case being propionic acid, with the accompanying formation of butyl butyrate and amyl butyrate. Effluent from reaction zone 87 is passed through line 88 and contains propionic acid, butyl butyrate, amyl butyrate, and a slight excess of butyric acid as the chief components, together with sulfuric acid and is passed to fractionation zone 89, wherein it is separated by fractionation into an overhead product containing propionic acid, butyl butyrate and butyric acid, and residual amyl butyrate. Overhead product from zone 89 is passed through line 91 to fractionation zone 93 wherein propionic acid is separated as an overhead product, withdrawn through line 94, and butyl butyrate together with some unreacted butyric acid is obtained as residual product, withdrawn through lines 95 and 96. Amyl butyrate together with sulfuric acid is obtained as residual product in zone 89 and may be withdrawn through line 90 and passed through line 92 to water wash zone 58 wherein it is contacted with water introduced through line 59. Aqueous sulfuric acid is withdrawn from zone 58 through lines 55 and 60, or may be recycled to line 53 from line 55 through line 65. Amyl butyrate, free of sulfuric acid is withdrawn from zone 58 through lines 50 and 70, or it may be passed through line 75 to line 98 for utilization discussed hereafter.

Generally, I prefer to utilize the propyl acetate, butyl butyrate, and amyl butyrate without further treatment. However, if desired, those products, together with propyl acetate, may be reconverted to the corresponding alcohol and acid by conventional saponification and hydrolysis methods known to those skilled in the art. When reconverting in this manner, butyl butyrate-butyric acid from line 95, amyl butyrate from lines 90 or 75 as desired, and propyl acetate from line 81 may be respectively passed through lines 97, 98 and 83 to saponification and acid liberation zone 100 comprising reaction vessels, fractionation equipment, separators, storage tanks and the like, not individually illustrated, which may be utilized in the saponification and hydrolysis steps of the process of this invention. In accordance with well-known procedures, an ester in zone 100 may be reacted with ethanolic KOH, or with about a 20 per cent aqueous KOH to form the corresponding alkanol and alkanoate, the latter then being reacted in the presence of a dilute mineral acid to form the alkanoic acid. Accordingly, in zone 100 butyl butyrate is converted to butanol and butyric acid, amyl butyrate is converted to pentanol, and butyric acid and propyl acetate are converted to propanol and acetic acid. From zone 100 propanol is withdrawn from line 99, butanol from line 101, pentanol from line 102, propionic acid from line 103, butyric acid from lines 85 and 106, and acetic acid from line 107. Butyric acid from line 85 may be recycled to line 84 through line 108, if desired.

Because some concentration of sulfuric acid takes place in zones 87 and 89, it may be preferable to conduct the steps in zones 87 and 89 at reduced pressure, thereby minimizing the temperature and reducing the extent of any oxidation of product that may take place in either or both those zones.

Material passed to saponification zone 100 through lines 90 and 98, contains sulfuric acid which may be neutralized in zone 109 by the introduction of a proportionately increased amount of alkali into the saponification reaction.

The displacement type reaction already discussed, may be conducted in the absence of a catalyst and it is within the scope of this invention to recover the mineral acid from the esterification effluent and to conduct the steps in zones 76 and 87, already discussed, in the absence of an acid catalyst. However, I preferably retain the mineral acid in the system, both as a matter of convenience and because of its strong displacement promoting characteristics when present in those subsequent displacement reactions.

In one embodiment of my invention, the displacement already described as taking place in zone 87, may be conducted in zone 76 without addition of supplementary butyric acid in any case wherein the synthesis reaction in zone 14 is conducted so as to produce organic acids in yields sufficiently high to provide all the butyric acid needed to displace propionic acid from the propionates. In such an instance, bottoms product from zone 76 may be passed directly to zone 89 through lines 77, 80 and 88.

In another embodiment of my invention butyric acid may be introduced into the system through line 45, in which case the displacement reaction already described as taking place in zone 87, would take place in zone 76 during fractionation. When operating in this manner, bottom product from zone 76 may be passed directly to fractionation zone 89 through lines 77, 80 and 88.

For convenience and clarity certain apparatus such as pumps, surge tanks, accumulators, valves, etc. have not been shown in the drawing. Obviously such modification of the present invention may be practiced without departing from the scope of the invention.

As has already been stated, various modifications of the above described embodiment may be practiced. For example, the solvent may be retained in the extract until after the esterification, and removed with the water of esterification simultaneously. However, in such practice, the esterification reaction is slower, in view of the accompanying high state of dilution of the reactants. If desired, only part of the solvent may be removed before esterification.

Among the solvents that can be used in the extraction step are high molecular weight solvents from which the dissolved components may be distilled.

By the topping operation, organic acids are separated from the light overhead product, and accordingly, the formation of ester impurities in subsequent steps of separation of light fractions is prevented.

Solvent extraction of the organic components present in the residual aqueous phase from the topping operation is especially advantageous from an economic point of view since the separation by fractionation of those components from a large volume of water is expensive and time consuming. Furthermore, since it is general practice to remove organic acids from such aqueous mixtures by solvent extraction, the cost of the additional small amount of solvent required for simultaneously extracting the alcohols, is insignificant.

My invention is illustrated by the following example. The reactants, their proportions, and other specific ingredients are presented as being typical and should not be construed to limit the invention unduly.

Aqueous phase product from the catalytic hydrogenation of carbon monoxide having the following weight distribution,

| | Lbs. |
|---|---|
| Water | 12.32 |
| Acetaldehyde | 0.075 |
| Acetone-methanol | 0.062 |
| Ethanol | 0.578 |
| n-Propanol | 0.107 |
| n-Butanol | 0.042 |
| n-Pentanol | 0.011 |
| Acetic acid | 0.205 |
| Propionic acid | 0.054 |
| Butyric acid | 0.017 | is charged to a fractionating column and topped at 85° C. Acetaldehyde, acetone, methanol, ethanol and a small amount of water, are separated as overhead product and are fractionated further to produce commercial grade chemicals. Aqueous residual product from the topping step is then extracted with about 13.7 lbs. of diethyl ether to separate the dissolved organic oxygenated compounds from the water. The diethyl ether is then distilled from the resulting extract and sulfuric acid is added to the solvent-free extract in an amount up to 0.5 weight per cent. 0.6 lb. of benzene is then added. Esterification is then carried out, and water of esterification is removed as an azeotrope with the benzene. The resulting water-free mixture is then fractionated to produce propyl acetate and unreacted acetic acid as an overhead product, after which 0.061 lb. of butyric acid is added to completely displace propionic acid from the propionates in the residual product.

Continued fractionation then yields propionic acid, butyl butyrate and amyl butyrate. The residual fractionation product which contains amyl butyrate plus a small amount of sulfuric acid, may be recycled to the esterification step.

As will be evident to those skilled in the art, various modifications of this invention can be made, or followed, in the light of the foregoing disclosure and discussion, without departing from the spirit or scope of the disclosure or from the scope of the claims.

I claim:

1. A process for the resolution of an aqueous phase product of catalytic hydrogenation of carbon monoxide to produce hydrocarbons and oxygenated derivatives of hydrocarbons, said aqueous phase containing acetaldehyde, acetone, methanol, ethanol, propanol, butanol, pentanol, acetic acid, propionic acid, and butyric acid, said process comprising distilling said aqueous phase and separating a mixture of acetaldehyde, acetone, methanol, and ethanol from the distilling mixture as overhead distillation product, recovering acetaldehyde, acetone, methanol, and ethanol from said overhead distillation product, separating a mixture of water, propanol, butanol, pentanol, acetic acid, propionic acid and butyric acid as residual product of said distilling and contacting the last said mixture with a solvent immiscible with water and having selective solvent power for propanol, butanol, pentanol, acetic acid, propionic acid, and butyric acid, separating a solvent-rich extract from the resulting solvent contacting mixture, separating solvent from said solvent-rich extract, whereby a solvent-free extract comprising propanol, butanol, pentanol, acetic acid, propionic acid, and butyric acid is formed, admixing an aqueous mineral acid with said solvent-free extract and heating the resulting acid-extract mixture at a temperature within the limits of 20 to 50° C., whereby esterification of alcohols and organic acids in said solvent-free extract takes place to form propyl acetate, butyl propionate and amyl propionate, butyl butyrate, and amyl butyrate, distilling the ester-containing acid-extract mixture and separating a mixture of acetic acid and propyl acetate from the distilling mixture as overhead distillation product, recovering acetic acid and propyl acetate from the last said overhead product, admixing butyric acid in an amount described hereafter, with the total residual product of the last said distilling and heating the resulting butyric acid-residual product admixture at a temperature within the limits of 120 to 200° C., whereby butyric acid reacts with butyl propionate and amyl propionate to form propionic acid, butyl butyrate and amyl butyrate, said amount of butyric acid being sufficient to supplement butyric acid initially present in said aqueous mixture to convert said butyl propionate and said amyl propionate to butyl butyrate and amyl butyrate as above described, distilling the resulting butyric acid-residual product admixture and recovering propionic acid, butyl butyrate and amyl butyrate as separate products of the last said distilling mixture.

2. A continuous process for the resolution of an aqueous solution of acetaldehyde, acetone, methanol, ethanol, propanol, butanol, pentanol, acetic acid, and propionic acid, comprising passing said aqueous solution to a first distillation zone and therein distilling acetaldehyde, acetone, methanol, and ethanol from said solution as overhead distillation product, passing said overhead to a first separation zone and therein separating said acetaldehyde, acetone, methanol, and ethanol, passing a mixture of water, propanol, butanol, pentanol, acetic acid, and propionic acid, as residual distillation product from said first distillation zone to a solvent extraction zone and therein contacting said residual product countercurrently with a solvent immiscible with water and having selective solvent power for propanol, butanol, pentanol, acetic acid, and propionic acid, passing solvent-rich extract from said solvent extraction zone to a solvent recovery zone and therein resolving solvent-rich extract into solvent and solvent-free extract, said solvent-free extract comprising propanol, butanol, pentanol, acetic acid, and propionic acid, recycling solvent from said solvent recovery zone to said solvent extraction zone, passing solvent-free extract together with an aqueous mineral acid into an esterification zone and therein heating said solvent-free extract in contact with said acid, whereby esterification of alcohols and organic acids in said solvent-free extract takes place to form propyl acetate, butyl propionate and amyl propionate, passing total effluent from said esterification zone together with a material capable of forming an azeotrope with water to a second distillation zone and therein distilling water of esterification from said total effluent admixture as an azeotrope with said azeotrope-forming material, esterification effluent thus free of water comprising propyl acetate, butyl propionate, amyl propionate, acetic acid, and propionic acid together with said mineral acid, passing water-free esterification effluent from said second distillation zone to a third distillation zone and therein separating from said effluent a mixture of propyl acetate and acetic acid as overhead distillation product, passing residual distillation product from said third distillation zone together with butyric acid in a mol ratio of butyric acid to total propionates within the range of from 1:1 to 5:1 into a reaction zone maintained at a temperature within the limits of 120 to 200° C., whereby butyric acid reacts with butyl propionate and amyl propionate in said residual product to form propionic acid, butyl butyrate and amyl butyrate, passing effluent from said reaction zone to a fourth distillation zone and therein separating a mixture of propionic acid and butyl butyrate as overhead distillation product and a mixture of amyl butyrate, and said acid, as residual distillation product, passing the last said overhead to a second separation zone and therein separating propionic acid and butyl butyrate, passing the last said residual product to a third separation zone and therein separating amyl butyrate and said acid, passing said propyl acetate-acetic acid overhead product mixture to a separation zone and therein separating propyl acetate and acetic acid, and recovering acetaldehyde, acetone, methanol, ethanol, propyl acetate, acetic acid, propionic acid, butyl butyrate and amyl butyrate as products of the process.

3. In the resolution of a mixture of propanol, butanol, pentanol, acetic acid, and propionic acid, the improvement comprising admixing an aqueous mineral acid with said mixture and heating the resulting mineral acid admixture to an esterification temperature, whereby esterification of alcohols and organic acids in said mixture takes place to form propyl acetate, butyl propionate and amyl propionate in said mixture, separating said propyl acetate and said acetic acid from the resulting ester-containing product, admixing residual ester-containing product with butyric acid and heating the admixture thus formed at a temperature within the limits of 120° and 200° C., whereby butyric acid reacts with butyl propionate and amyl propionate to form propionic acid, butyl butyrate, and amyl butyrate, and recovering said propionic acid, butyl butyrate, amyl butyrate, propyl acetate and acetic acid.

4. In a process for the catalytic hydrogenation of carbon monoxide to produce hydrocarbons and oxygenated compounds, wherein carbon monoxide is reacted with hydrogen in the presence of a fluidized iron catalyst at a temperature in the range of 295 to 325° C., at a pressure in the range of from 5 to 30 atmospheres, at a space velocity within the limits of 1500 to 3500 standard gas volumes of charge per volume of fluidized catalyst per hour, and while maintaining a mol ratio of hydrogen to carbon monoxide within the limits of 0.5:1 to 2.5:1, wherein the total product of said reacting comprises hydrocarbons, oxygen-containing compounds and water, and consists of an aqueous phase and a hydrocarbon-rich phase, wherein said aqueous phase contains acetaldehyde, acetone, methanol, ethanol, propanol, butanol, pentanol, acetic acid, and propionic acid as the chief organic components, the improvement comprising distilling said aqueous phase and separating a mixture of acetaldehyde, acetone, methanol, and ethanol from the distilling mixture as overhead distillation product, separating acetaldehyde, acetone, methanol, and ethanol from said overhead product, separating total residual product of said distillation and contacting same with a solvent immiscible with water and having selective solvent power for propanol, butanol, pentanol, acetic acid, and propionic acid, separating solvent-rich extract from the resulting mixture of solvent and said residual product, separating solvent from said solvent-rich extract, whereby a solvent-free extract is formed comprising propanol, butanol, pentanol, acetic acid, and propionic acid, admixing an aqueous mineral acid with said solvent-free extract and heating the resulting acid-extract mixture at a temperature within the limits of 20 to 50° C., whereby esterification of alcohols and organic acids in said solvent-free extract takes place to form propyl acetate, butyl propionate and amyl proprionate, distilling total effluent from said esterification and separating a mixture of acetic acid and propyl acetate from the distilling mixture as overhead distillation product, separating propyl acetate and acetic acid in the last said distillation overhead, admixing butyric acid with the total residual product from the last said distillation and heating the resulting residual product-butyric acid admixture at a temperature within the limits of 120 to 200° C., whereby butyric acid reacts with butyl propionate and amyl propionate to form propionic acid, butyl butyrate and amyl butyrate, distilling the resulting butyric acid-residual product reaction mixture and separating propionic acid, butyl butyrate, and amyl butyrate as products of the last said distilling, saponifying said propyl acetate, said amyl butyrate, and said butyl butyrate respectively to propanol and an acetate, pentanol and a butyrate, and butanol and a butyrate, and converting said acetate and each said butyrate respectively to acetic acid and butyric acid by hydrolysis, and recovering acetaldehyde, acetone, methanol, ethanol, propanol, butanol, pentanol, acetic acid, and propionic acid, as products of the process.

5. In a process for the hydrogenation of carbon monoxide to produce hydrocarbons and oxygen-containing derivatives of hydrocarbons, wherein aqueous phase product is formed which contains acetaldehyde, acetone, methanol, ethanol, propanol, butanol, pentanol, acetic acid, and propionic acid, as the chief organic components, and which is not readily resolved by distillation alone, the improvement comprising distilling said aqueous phase and recovering from said distillation a mixture of acetaldehyde, acetone, methanol, and ethanol as overhead product, separating acetaldehyde, acetone, methanol, and ethanol in said overhead product, contacting total residual aqueuos product of said distillation with a solvent immiscible with water and having selective solvent power for propanol, butanol, pentanol, acetic acid, and propionic acid, separating solvent-rich extract from the resulting mixture of solvent and residual distillation product, separating solvent from said solvent-rich extract, said solvent-free extract comprising propanol, butanol, pentanol, acetic acid, and propionic acid, admixing aqueous mineral acid with said solvent-free extract and heating the resulting acid-extract mixture whereby esterification of alcohols and organic acids in said solvent-free extract takes place to form propyl acetate, butyl propionate and amyl propionate, distilling total effluent from said esterification and separating a mixture of acetic acid and propyl acetate therefrom as an overhead distillation product, separating acetic acid and propyl acetate in the last said overhead, admixing an organic acid selected from the group consisting of butyric acid and valeric acid with a high boiling residual product fraction from the last said distilling and heating the resulting residual product-organic acid admixture at a temperature within the limits of 120 to 200° C., whereby said organic acid reacts with butyl propionate and amyl propionate to form propionic acid and the corresponding ester product, and recovering said propionic acid, each of said corresponding products, acetaldehyde, acetone, methanol, ethanol, propyl acetate and acetic acid.

6. A process for the resolution of an aqueous phase product of catalytic hydrogenation of carbon monoxide to produce hydrocarbons and oxygenated derivatives of hydrocarbons, said aqueous phase containing acetaldehyde, acetone, methanol, ethanol, propanol, butanol, pentanol, acetic acid, propionic acid, and butyric acid, the amount of said butyric acid in said aqueous phase being sufficient to react with butyl propionate and amyl propionate to form propionic acid, butyl butyrate, and amyl butyrate as described hereafter, said process comprising distilling said aqueous phase and separating a mixture of acetaldehyde, acetone, methanol, and ethanol from the distilling mixture as overhead distillation product, recovering acetaldehyde, acetone, methanol, and ethanol from said overhead distillation product, separating a mixture of water, propanol, butanol, pentanol, acetic acid, propionic acid, and butyric acid as total residual product of said distilling and contacting the last said mixture with a solvent immiscible with water and having selective solvent power for propanol, butanol, pentanol, acetic acid, propionic acid, and butyric acid, separating a solvent-rich extract from the resulting solvent contacting mixture, separating solvent from said solvent-rich extract, whereby a solvent-free extract comprising propanol, butanol, pentanol, acetic acid, propionic acid, and butyric acid is formed, admixing an aqueous mineral acid with said solvent-free extract and heating the resulting acid-extract mixture at a temperature within the limits of 20 to 50° C., whereby esterification of alcohols and organic acids in said solvent-free extract takes place to form propyl acetate, butyl propionate and amyl propionate, distilling the ester-containing acid-extract mixture and separating a mixture of acetic acid and propyl acetate from the distilling mixture as overhead distillation product, recovering acetic acid and propyl acetate from the last said overhead product, during the last said distilling butyric acid reacting with butyl propionate and amyl propionate to form propionic acid, butyl butyrate and amyl butyrate, from the last said distilling withdrawing total residual product containing propionic acid, butyl butyrate, amyl butyrate, and any butyric acid unreacted during said last distilling, and recovering from the last said residual product propionic acid, butyl butyrate, and amyl butyrate.

7. A process for the resolution of a aqueous phase product of catalytic hydrogenation of carbon monoxide to produce hydrocarbons and oxygenated derivatives of hydrocarbons, said aqueous phase containing acetaldehyde, acetone, methanol, ethanol, propanol, butanol, acetic acid, and propionic acid, said process comprising distilling said aqueous phase and separating a mixture of acetaldehyde, acetone, methanol, and ethanol from the distilling mixture as overhead distilling product, recovering acetaldehyde, acetone, methanol, and ethanol from said overhead distillation product, separating a mixture of water, propanol, butanol, pentanol, acetic acid, and propionic acid as residual product of said distilling and contacting the last said mixture with a solvent immiscible with water and having selective solvent power for propanol, butanol, pentanol, acetic acid, and propionic acid, separating a solvent-rich extract from the resulting solvent contacting mixture, separating solvent from said solvent-rich extract, whereby a solvent-free extract comprising propanol, butanol, pentanol, acetic acid, and propionic acid is formed, admixing an aqueous mineral acid with said solvent-free extract and heating the resulting acid-extract mixture at a temperature within the limits of 20 to 50° C., whereby esterification of alcohols and organic acids in said solvent-free extract takes place to form propyl acetate, butyl propionate and amyl propionate, admixing butyric acid with the ester-containing mineral acid-extract mixture and distilling the resulting butyric acid-mineral-acid-extract mixture, separating a mixture of acetic acid and propyl acetate from the last said distilling as overhead product, recovering acetic acid and propyl acetate from the last said overhead, during the last said distillation butyric acid reacting with butyl propionate and amyl propionate to form butyl butyrate and amyl butyrate, withdrawing total residual product from the last said distilling containing propionic acid, butyl butyrate, amyl butyrate, and any butyric acid unreacted during said last distilling, and recovering propionic acid, butyl butyrate, and amyl butyrate from the last said residual product.

8. The process of claim 2 wherein said mineral acid introduced into said esterification zone is aqueous sulfuric acid containing from 0.01 to 0.5 weight per cent sulfuric acid.

9. The process of claim 2 wherein said solvent is diethyl ether.

10. The process of claim 2 wherein said azeotrope forming material is benzene.

11. In the resolution of a mixture of propanol, butanol, pentanol, acetic acid, and propionic acid, the improvement comprising admixing an aqueous mineral acid with said mixture and heating the resulting mineral acid-containing admixture to an esterification temperature, whereby esterification of alcohols and organic acids in said mixture takes place to form propyl acetate, butyl propionate and amyl propionate, separating said propyl acetate and said acetic acid from the resulting ester-containing product, admixing residual ester-containing product with an organic acid selected from the group consisting of valeric acid and butyric acid and heating the admixture thus formed at a temperature within the limits of 120 to 200° C., whereby said organic acid reacts with butyl propionate and amyl propionate therein to form propionic acid and the corresponding ester product, and recovering said propionic acid and said corresponding ester product.

JOHN S. CROMEANS.

No references cited.